No. 828,928. PATENTED AUG. 21, 1906.
J. C. CLARK.
SCREENING APPARATUS.
APPLICATION FILED SEPT. 27, 1905.

Witnesses
Inventor
John C. Clark
by Foster Freeman & Watson
Attorneys

THE NORRIS PETERS CO., WASHINGTON, D. C.

UNITED STATES PATENT OFFICE.

JOHN C. CLARK, OF ATLANTA, GEORGIA.

SCREENING APPARATUS.

No. 828,928.  Specification of Letters Patent.  Patented Aug. 21, 1906.

Application filed September 27, 1905. Serial No. 280,376.

*To all whom it may concern:*

Be it known that I, JOHN C. CLARK, a citizen of the United States, and a resident of Atlanta, Fulton county, State of Georgia, have invented certain new and useful Improvements in Screening Apparatus, of which the following is a specification.

This invention relates to means for bolting or screening ore, fertilizer, or other material which is to be separated into different grades or degrees of fineness.

The invention will be described in connection with the accompanying drawings, in which—

Figure 1:
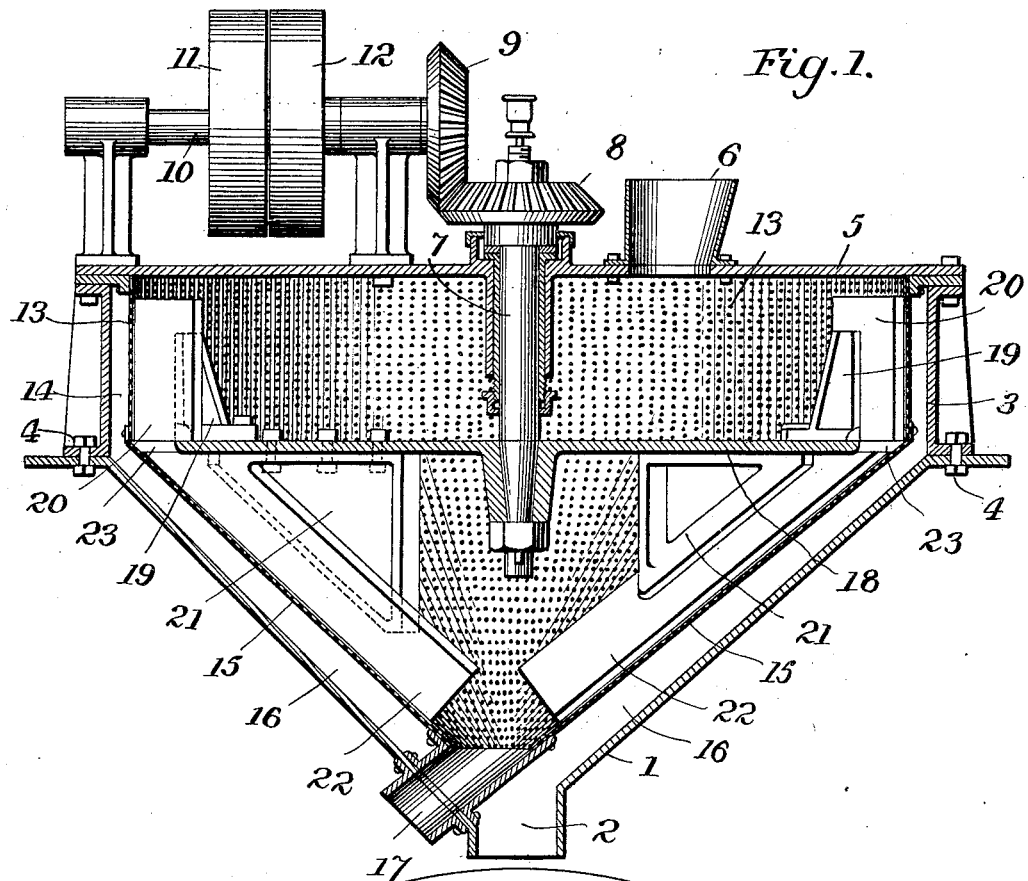
Figure 2:
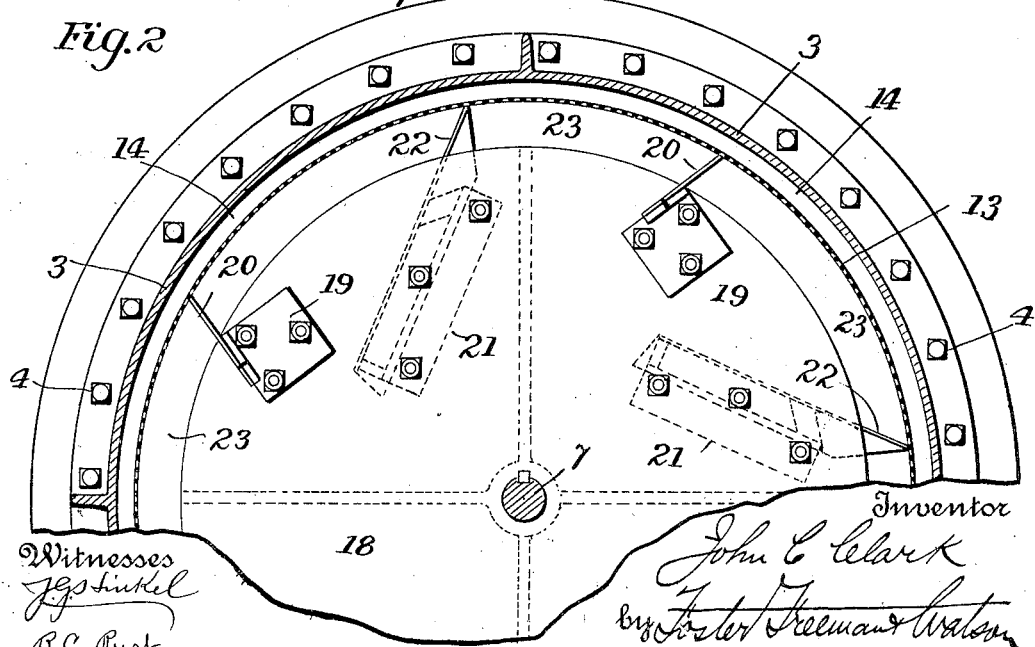

Figure 1 is a vertical section through the machine. Fig. 2 is a horizontal section.

Referring to the drawings, 1 indicates a fixed conical casing which tapers downward and terminates in a discharge-chute 2. Upon the casing 1 is a circular or cylindrical casing 3, which may be integral with the casing 1 or suitably connected thereto, as by bolts 4. Secured to the cylindrical casing 3 is a cover or top plate 5, provided with a hopper 6. Seated in a suitable bearing in the center of the plate 5 is a vertical shaft 7, which shaft is driven by bevel-gears 8 9, the latter being on a counter-shaft 10, which is supported in brackets upon the plate 5 and provided with fast and loose pulleys 11 12.

Rigidly supported within the cylindrical casing 3 is a cylindrical screen 13, of slightly less diameter than the casing 3 and separated therefrom by an annular space 14. Rigidly connected with the screen 13 is a conical screen 15, having its wall parallel or nearly parallel with the casing 1 and separated therefrom by an annular space 16. The lower end of the conical screen 15 communicates with a chute 17, which chute is in the form of a tube rigidly connected to the casing 1 and to the conical screen and forming a support for the latter.

Upon the lower end of the shaft 7 is rigidly mounted a disk 18, which is horizontal, the shaft being vertical. Upon the periphery of the disk are mounted brackets 19, to which are connected sweeps 20, of suitable material, projecting beyond the disk, with their edges close to the screen and adapted to travel in contact with or very close thereto. Below the disk 18 are brackets 21, to which are connected inclined sweeps 22, of suitable material, adapted to travel in contact with or very close to the surface of the conical screen 15.

The sweeps 22 terminate near the upper end of the chute 17.

The operation is as follows: The casing and screens are stationary, while the shaft 7 and the disk and sweeps carried thereby are rotated with suitable rapidity. The material fed through the hopper 6 falls on the disk 18 and is driven outward by centrifugal force between the sweeps and against the screen 13. The sweeps being at an angle to the screen, with their edges close thereto, form pockets in which the particles rest as they are carried around by the sweeps in contact with the screen with a rubbing action which forces more or less of it through the screen 13 into the space 14. The remainder of the material passes through opening 23 at the periphery of the disk 18 and travels down over the conical screen 15, being subjected to the action of the sweeps 22. On account of the centrifugal force created by the sweeps 22, carrying the material around in the screen 15, the downward progress of the material will not be rapid and all of the fine material remaining will pass through the screen. The coarser material will be discharged through the chute 17, while the fine material which has passed through the screen will all be discharged through the chute 2.

Having described my invention, what I claim, and desire to secure by Letters Patent, is—

1. In apparatus of the class described, the combination of a circular casing, a top plate connected to said casing, a conical casing below the said circular casing, a circular screen within the circular casing, a conical screen within the conical casing, a vertical centrally-arranged shaft, a disk carried by said shaft, sweeps carried by said disk and arranged to travel in contact with said screens, and discharge-chutes respectively from said screens and from the space between said screens and the casing.

2. In apparatus of the class described, the combination with an annular casing having a top plate, of a vertically-arranged shaft mounted to rotate in a bearing in said top plate, a circular screen within the casing, a conical screen below said casing, a disk carried by said shaft, sweeps arranged above and below said disk and adapted to travel in contact with said screens, said casing having a hopper in its upper part to receive the material to be operated on, and said disk being of less diameter than the casing to provide an opening at its periphery to permit a portion of said material to pass.

3. In apparatus of the class described, the combination of a casing comprising an annular portion, a top plate above said portion and a conical portion below said annular portion, a screen within said casing having an annular portion and a conical portion, the said screen being rigidly connected at its upper edge to the casing and at its lower end to a discharge-chute supported on the casing, and a shaft vertically arranged within the casing and carrying sweeps adapted to coöperate with said screens said casing having feed and discharge openings for the material to be operated on.

In testimony whereof I have signed my name to this specification in the presence of two subscribing witnesses.

JOHN C. CLARK.

Witnesses:
   WM. A. HANXELL, Jr.,
   J. H. PORTER.